(12) United States Patent
Takeuchi

(10) Patent No.: US 8,663,434 B2
(45) Date of Patent: Mar. 4, 2014

(54) WATER ELECTROLYSIS SYSTEM AND METHOD FOR OPERATING WATER ELECTROLYSIS SYSTEM

(75) Inventor: Jun Takeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 13/449,314

(22) Filed: Apr. 18, 2012

(65) Prior Publication Data

US 2012/0298520 A1 Nov. 29, 2012

(30) Foreign Application Priority Data

May 23, 2011 (JP) .................... 2011-114303

(51) Int. Cl.
C25B 1/10 (2006.01)
C25B 1/12 (2006.01)

(52) U.S. Cl.
USPC .............. 204/228.5; 204/228.2; 205/628; 205/637

(58) Field of Classification Search
USPC .............. 204/228.2, 228.5; 205/628, 637
See application file for complete search history.

(56) References Cited

U.S. PATENT DOCUMENTS

| | | | |
|---|---|---|---|
| 7,921,883 B2 * | 4/2011 | Cohen et al. ................ | 141/49 |
| 2012/0018033 A1 * | 1/2012 | Nakazawa et al. ............ | 141/4 |
| 2012/0255868 A1 * | 10/2012 | Takeuchi et al. ............ | 205/628 |

FOREIGN PATENT DOCUMENTS

JP 2007-048599 2/2007

\* cited by examiner

*Primary Examiner* — Nicholas A Smith
(74) *Attorney, Agent, or Firm* — Ditthavong Mori & Steiner, P.C.

(57) ABSTRACT

A water electrolysis system includes a water electrolysis device, a gas-liquid separator, a water-amount detector, a hydrogen storage device, a hydrogen storage device, a decompressing device, and a control device. The control device includes a residual capacity calculator, a hydrogen production amount calculator, and an electrolysis termination determiner. The residual capacity calculator is configured to calculate a residual capacity of the hydrogen storage device. The hydrogen production amount calculator is configured to calculate an amount of hydrogen produced by the water electrolysis device in a drainage period in which the amount of water in the gas-liquid separator increases to an upper limit from a lower limit. The electrolysis termination determiner is configured to terminate the water electrolysis process when the amount of hydrogen calculated by the hydrogen production amount calculator is greater than the residual capacity calculated by the residual capacity calculator.

2 Claims, 9 Drawing Sheets

WATER ELECTROLYSIS SYSTEM AND METHOD FOR OPERATING WATER ELECTROLYSIS SYSTEM

CROSS-REFERENCE TO RELATED APPLICATIONS

The present application claims priority under 35 U.S.C. §119 to Japanese Patent Application No. 2011-114303, filed May 23, 2011, entitled "Water Electrolysis System and Method for Operating the Same." The contents of this application are incorporated herein by reference in their entirety.

BACKGROUND OF THE INVENTION

1. Field of the Invention

The present invention relates to a water electrolysis system, and a method for operating the water electrolysis system.

2. Discussion of the Background

Generally, hydrogen is used as fuel gas for power generation reaction in fuel cells. The hydrogen is produced by, for example, a water electrolysis device. The water electrolysis device decomposes water to generate hydrogen (and oxygen) by using a solid polymer electrolyte membrane (ion exchange membrane). An electrolyte membrane electrode assembly is formed by placing electrode catalyst layers on both sides of the solid polymer electrolyte membrane. A unit cell is formed by placing feeders on both sides of the electrolyte membrane electrode assembly.

A plurality of unit cells are stacked on top of each other to form a cell unit. A voltage is applied between the ends of the cell unit in the stacking direction, and water is supplied to the feeder at the anode side. Accordingly, water is decomposed and hydrogen ions (protons) are generated at the anode side of each electrolyte membrane electrode assembly. The generated hydrogen ions travel through the solid polymer electrolyte membrane to the cathode side, where the hydrogen ions combine with electrons to produce hydrogen. At the anode side, oxygen generated together with the hydrogen is discharged from the cell unit together with excess water.

The above-described water electrolysis device is generally installed in a hydrogen supply system for supplying hydrogen to an on-board hydrogen tank of a fuel cell vehicle. For example, Japanese Unexamined Patent Application Publication No. 2007-48599 discloses a hydrogen supplying method for supplying hydrogen to an on-board hydrogen tank of a fuel cell vehicle in a hydrogen supply system. The hydrogen supply system includes a water electrolysis device that electrolyzes water to generate high-pressure hydrogen and a hydrogen supply tank for supplying the hydrogen received from the water electrolysis device to the fuel cell vehicle.

According to this hydrogen supplying method, a first hydrogen pressure in the hydrogen supply tank and a second hydrogen pressure in the on-board hydrogen tank are detected. When it is determined that the difference between the first and second hydrogen pressures is greater than a specified pressure, the hydrogen in the hydrogen supply tank is supplied to the on-board hydrogen tank owing to the pressure difference.

When it is determined that the difference between the first and second hydrogen pressures is less than the specified pressure, the water electrolysis device is operated so as to generate hydrogen while the hydrogen is supplied to the on-board hydrogen tank by the pressure of the generated hydrogen.

Thus, the control of the water electrolysis device is simple and the hydrogen can be reliably and quickly supplied to the on-board hydrogen tank. Accordingly, the hydrogen can be easily and economically supplied to the fuel cell vehicle, and the overall system can be made small and simple.

SUMMARY OF THE INVENTION

According to one aspect of the present invention, a water electrolysis system includes a water electrolysis device, a gas-liquid separator, a water-amount detector, a hydrogen storage device, a hydrogen storage device, a decompressing device, and a control device. The water electrolysis device is to electrolyze water to generate oxygen and high-pressure hydrogen having a pressure higher than a pressure of the oxygen. The gas-liquid separator is provided in a hydrogen pipeline through which the high-pressure hydrogen is discharged from the water electrolysis device. The gas-liquid separator is provided to separate water from the high-pressure hydrogen. The water-amount detector is configured to detect an amount of water in the gas-liquid separator. The hydrogen storage device is to store the high-pressure hydrogen discharged from the gas-liquid separator. The decompressing device is to decompress and drain the gas-liquid separator when a water electrolysis process performed by the water electrolysis device is terminated. The control device includes a residual capacity calculator, a hydrogen production amount calculator, and an electrolysis termination determiner. The residual capacity calculator is configured to calculate a residual capacity. The residual capacity corresponds to an amount of hydrogen required to make the hydrogen storage device full from when it is detected by the water-amount detector that the amount of water in the gas-liquid separator is at an upper limit with reference to which it is determined that drainage of the water in the gas-liquid separator is necessary. The hydrogen production amount calculator is configured to calculate an amount of hydrogen produced by the water electrolysis device in a drainage period in which the amount of water in the gas-liquid separator increases to the upper limit from a lower limit with reference to which the drainage is stopped. The electrolysis termination determiner is configured to terminate the water electrolysis process when the amount of hydrogen calculated by the hydrogen production amount calculator is greater than the residual capacity calculated by the residual capacity calculator.

According to another aspect of the present invention, a method is for operating a water electrolysis system includes: calculating a residual capacity of a hydrogen storage device using a control device, the residual capacity corresponding to an amount of hydrogen required to make the hydrogen storage device full from when an amount of water in a gas-liquid separator is at an upper limit with reference to which it is determined that drainage is necessary; calculating, using the control device, an amount of hydrogen produced by the water electrolysis device in a drainage period in which the amount of water in the gas-liquid separator increases to the upper limit from a lower limit with reference to which the drainage is stopped; and terminating a water electrolysis process performed by the water electrolysis device when the amount of hydrogen calculated by the control device is greater than the residual capacity calculated by the control device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
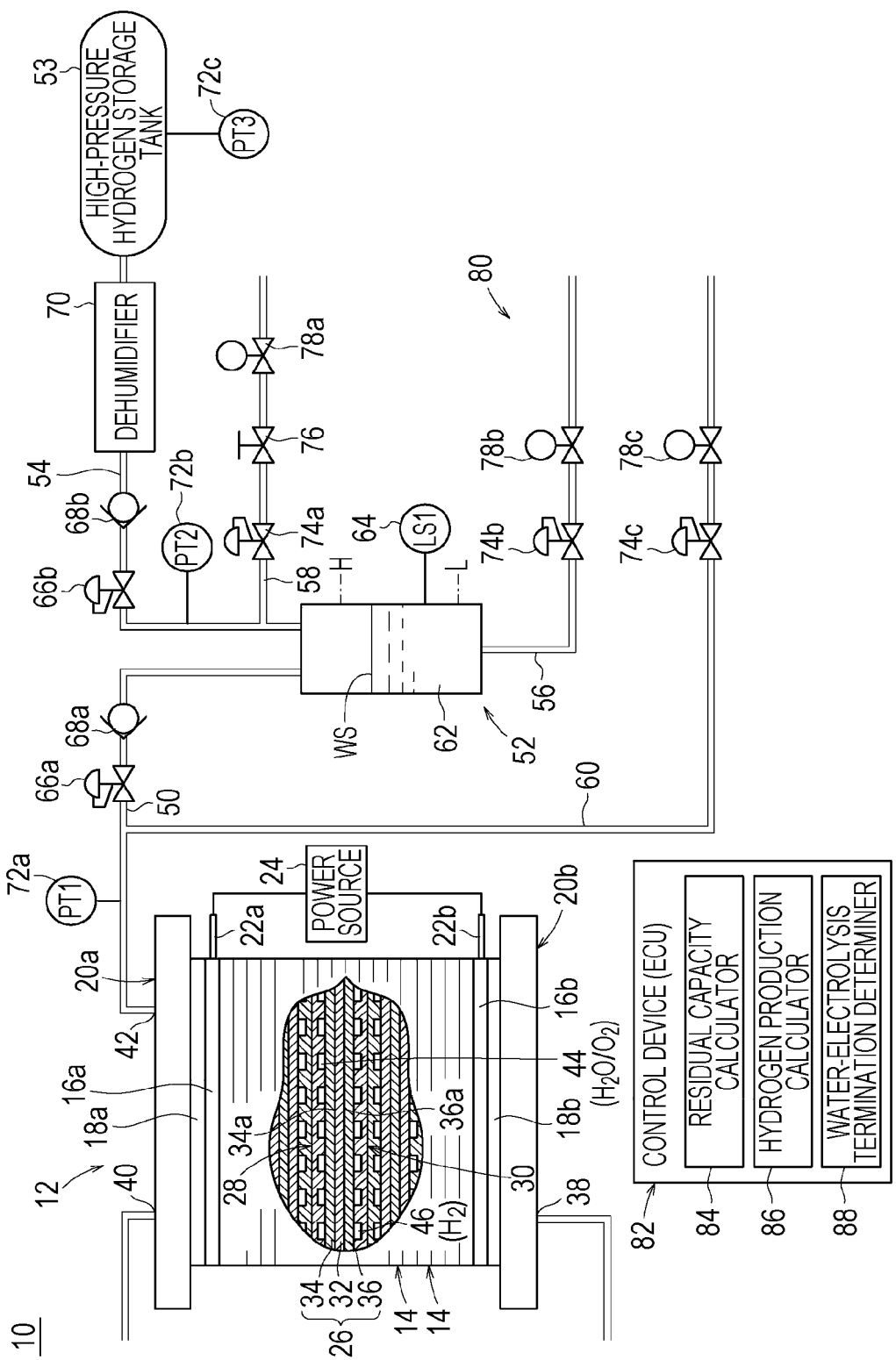
FIG. 1 is a schematic diagram illustrating a water electrolysis system according to a first embodiment.

The embodiments will now be described with reference to the accompanying drawings, wherein like reference numerals designate corresponding or identical elements throughout the various drawings.

As illustrated in FIG. 1, a water electrolysis system 10 according to a first embodiment includes a differential-pressure-type water electrolysis device (high-pressure hydrogen producing apparatus) 12 that electrolyzes water (pure water) to produce oxygen and high-pressure hydrogen. The pressure of the high-pressure hydrogen is higher than the oxygen pressure, which is the normal pressure, and is in the range of, for example, 1 MPa to 70 MPa.

The water electrolysis device 12 includes a cell unit in which a plurality of unit cells 14 are stacked. A terminal plate 16a, an insulating plate 18a, and an end plate 20a are arranged in that order toward the outside at one end of the water electrolysis device 12 in a stacking direction in which the unit cells 14 are stacked. Similarly, a terminal plate 16b, an insulating plate 18b, and an end plate 20b are arranged in that order toward the outside at the other end of the water electrolysis device 12 in the stacking direction of the unit cells 14. The components disposed between the end plates 20a and 20b are integrally fastened together.

Terminals 22a and 22b project outward from side portions of the terminal plates 16a and 16b, respectively. The terminals 22a and 22b are electrically connected to an electrolysis power source 24.

Each unit cell 14 includes a disc-shaped electrolyte membrane electrode assembly 26, an anode-side separator 28, and a cathode-side separator 30. The electrolyte membrane electrode assembly 26 is sandwiched by the anode-side separator 28 and the cathode-side separator 30. The anode-side separator 28 and the cathode-side separator 30 are disc-shaped.

The electrolyte membrane electrode assembly 26 includes a solid polymer electrolyte membrane 32, an anode current collector 34, and a cathode current collector 36. The solid polymer electrolyte membrane 32 is, for example, a thin membrane of perfluorosulfonic acid that is impregnated with water. The anode current collector 34 and the cathode current collector 36 are provided on both sides of the solid polymer electrolyte membrane 32.

An anode electrode catalyst layer 34a and a cathode electrode catalyst layer 36a are formed on both sides of the solid polymer electrolyte membrane 32. The anode electrode catalyst layer 34a is made of, for example, a Ru (ruthenium) based catalyst, and the cathode electrode catalyst layer 36a is made of, for example, a platinum catalyst.

A water supply passage 38, a discharge passage 40, and a hydrogen passage 42 are formed at the outer periphery of the unit cells 14. The water supply passage 38 extends continuously in the stacking direction to allow water (pure water) to be supplied therethrough. The discharge passage 40 extends continuously in the stacking direction to allow the oxygen generated by the reaction and unreacted water (mixed fluid) to be discharged therethrough. The hydrogen passage 42 extends continuously in the stacking direction to allow the hydrogen generated by the reaction to flow therethrough.

A first flow field 44 that communicates with the water supply passage 38 and the discharge passage 40 is formed in the surface of each anode-side separator 28 that faces the electrolyte membrane electrode assembly 26. The first flow field 44 is provided over an area corresponding to the surface area of the anode current collector 34, and includes a plurality of channel grooves and a plurality of embossed portions. The oxygen generated by the reaction and the unreacted water flow through the first flow field 44.

A second flow field 46 that communicates with the hydrogen passage 42 is formed in the surface of each cathode-side separator 30 that faces the electrolyte membrane electrode assembly 26. The second flow field 46 is provided over an area corresponding to the surface area of the cathode current collector 36, and includes a plurality of flow passage grooves and a plurality of embossed portions. The high-pressure hydrogen generated by the reaction flows through the second flow field 46.

One end of a hydrogen pipeline 50 through which the high-pressure hydrogen is discharged from the water electrolysis device 12 is connected to the hydrogen passage 42. The other end of the hydrogen pipeline 50 is connected to a gas-liquid separator 52.

The gas-liquid separator 52 removes water from the high-pressure hydrogen discharged from the water electrolysis device 12. The gas-liquid separator 52 is connected to a high-pressure-hydrogen guide pipeline 54, through which the high-pressure hydrogen separated from the water is guided to a high-pressure-hydrogen storage tank (hydrogen storage device) 53, and a drainpipe 56, through which the removed water is discharged.

A gas-phase decompression line 58 is provided at an outlet of the gas-liquid separator 52. The gas-phase decompression line 58 is used to degas the gas-liquid separator 52 before the water is discharged from the gas-liquid separator 52 through the drainpipe 56. The gas-phase decompression line 58 substantially branches from the high-pressure-hydrogen guide pipeline 54 at a position near the gas-liquid separator 52.

The hydrogen pipeline 50 is provided with a water-electrolysis-apparatus decompression line 60 that branches from the hydrogen pipeline 50 at a position upstream of the gas-liquid separator 52. The water-electrolysis-apparatus decompression line 60 is used to decompress the water electrolysis device 12.

The gas-liquid separator 52 includes a tank unit 62 for storing the water. The tank unit 62 is provided with a water-level detection sensor (water-amount detector) 64 that detects whether or not a water level WS in the tank unit 62 is at an upper limit height H (upper limit of the amount of water) or a lower limit height L (lower limit of the amount of water). The water-level detection sensor 64 may detect whether or not the amount of water is at the upper limit or the lower limit by detecting the weight of the tank unit 62 instead of the water level. Alternatively, a water electrolysis time may be measured to detect whether or not the amount of water is at the upper limit or the lower limit.

A first back-pressure valve 66a and a first check valve 68a are arranged in the hydrogen pipeline 50 at positions between the branching point of the water-electrolysis-apparatus decompression line 60 and the gas-liquid separator 52.

A second back-pressure valve 66b and a second check valve 68b are arranged in the high-pressure-hydrogen guide pipeline 54 at positions downstream of the branching point of the gas-phase decompression line 58. A dehumidifier 70 is disposed downstream of the second check valve 68b.

A first pressure gauge 72a is provided in the hydrogen pipeline 50 at a position near the outlet of the water electrolysis device 12. A second pressure gauge 72b is provided in the high-pressure-hydrogen guide pipeline 54 at a position between the second back-pressure valve 66b and the branching point of the gas-phase decompression line 58. A third pressure gauge 72c is provided in the high-pressure-hydrogen storage tank 53. A first reducing valve 74a, a throttle 76, and a first on-off valve 78a are arranged in the gas-phase decompression line 58. The throttle 76 is formed of, for example, an orifice and a needle valve.

A second reducing valve 74b and a second on-off valve 78b are arranged in the drainpipe 56. A third reducing valve 74c and a third on-off valve 78c are arranged in the water-electrolysis-apparatus decompression line 60. The first to third reducing valves 74a to 74c, the throttle 76, and the first to third on-off valves 78a to 78c form a decompressing device 80.

Each of the devices including the above-described valves and the entire system are controlled by a control device 82, such as an electronic control unit (ECU).

The control device 82 includes a residual capacity calculator 84, a hydrogen production amount calculator 86, and a water electrolysis termination determiner 88. The residual capacity calculator 84 calculates a residual capacity, which corresponds to an amount of hydrogen required to make the high-pressure-hydrogen storage tank 53 full from when it is detected by the water-level detection sensor 64 that the water level (amount of water) in the gas-liquid separator 52 is at the upper limit height H (upper limit of the amount of water), with reference to which it is determined that drainage is necessary. The hydrogen production amount calculator 86 calculates an amount of hydrogen produced by the water electrolysis device 12 in a drainage period in which the water level (amount of water) in the gas-liquid separator 52 rises to the upper limit height H from the lower limit height L (lower limit of the amount of water), with reference to which the drainage is stopped. The water electrolysis termination determiner 88 terminates the water electrolysis process performed by the water electrolysis device 12 when the residual capacity calculated by the residual capacity calculator 84 is less than the amount of hydrogen calculated by the hydrogen production amount calculator 86.

The residual capacity is an amount of hydrogen required to make the high-pressure-hydrogen storage tank 53 full from the state in which the high-pressure-hydrogen storage tank 53 is partially filled with hydrogen or the high-pressure-hydrogen storage tank 53 is substantially empty.

The operation of the water electrolysis system 10 having the above-described structure will now be described.

Figure 2:
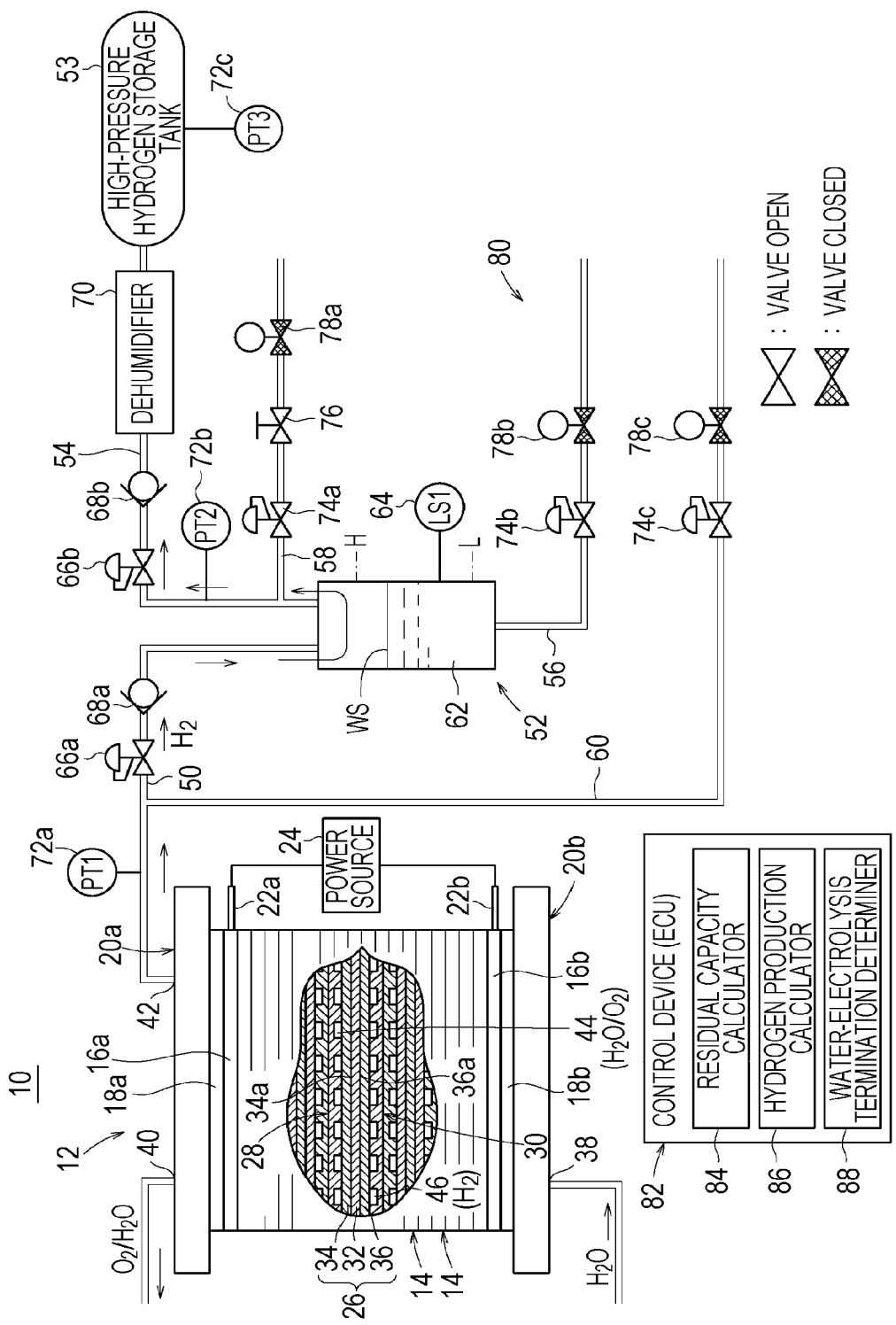
FIG. 2 illustrates a normal operation of the water electrolysis system.

Referring to FIG. 2, in a normal operation of the water electrolysis system 10, the first to third on-off valves 78a to 78c are closed. Pure water is supplied to the water electrolysis device 12 by a water circulation device (not shown). A voltage (current) is applied between the terminals 22a and 22b of the terminal plates 16a and 16b, respectively, by the electrolysis power source 24 that are electrically connected to the terminals 22a and 22b.

Accordingly, in each unit cell 14, the water is supplied to the first flow field 44 in the anode-side separator 28 through the water supply passage 38, and flows along the anode current collector 34. The water is decomposed by electricity into hydrogen ions, electrons, and oxygen at the anode electrode catalyst layer 34a. The hydrogen ions generated by the anodic reaction flow through the solid polymer electrolyte membrane 32 toward the cathode electrode catalyst layer 36a, and combine with electrons to generate hydrogen.

Thus, hydrogen and the transmitted water flow through the second flow field 46 formed between the cathode-side separator 30 and the cathode current collector 36. The pressure of the hydrogen is maintained at a pressure higher than that in the water supply passage 38, so that the hydrogen flows through the hydrogen passage 42 to the outside of the water electrolysis device 12.

Figure 3:
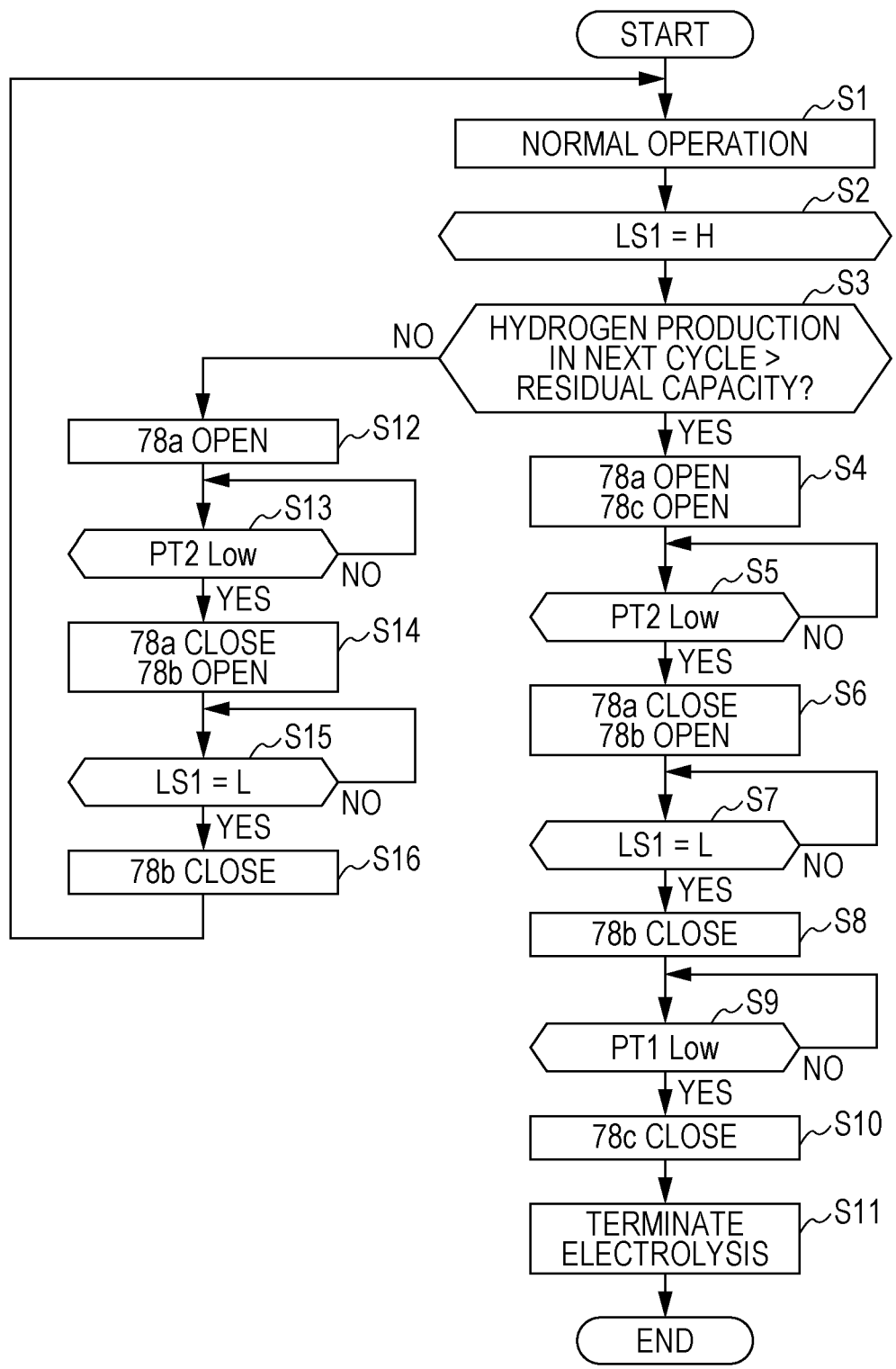
FIG. 3 is a flowchart of a method for operating the water electrolysis system.

An operating method according to a first embodiment will now be described below with reference to the flowchart of FIG. 3.

In the water electrolysis system 10, the normal operation (hydrogen producing process) is performed as described above (step S1). The high-pressure hydrogen is caused to flow to the gas-liquid separator 52 through the hydrogen pipeline 50, and water is separated from the high-pressure hydrogen and stored in the tank unit 62 of the gas-liquid separator 52.

The high-pressure hydrogen is discharged from the gas-liquid separator 52 through the high-pressure-hydrogen guide pipeline 54. When the pressure of the high-pressure hydrogen exceeds a set pressure of the second back-pressure valve 66b, the high-pressure hydrogen is supplied to the dehumidifier 70, and dry high-pressure hydrogen is produced. The dry high-pressure hydrogen is introduced into the high-pressure-hydrogen storage tank 53, and the amount of dry high-pressure hydrogen in the high-pressure-hydrogen storage tank 53 is detected by the third pressure gauge 72c.

When the water electrolysis device 12 continuously performs the water electrolysis process, the water level WS in the tank unit 62 rises. The water level WS in the tank unit 62 is detected by the water-level detection sensor 64 provided on the tank unit 62. When the water level WS reaches the upper limit height H (step S2), the process proceeds to step S3, where it is determined whether or not the amount of hydrogen produced in the next drainage cycle (next cycle) is greater than the residual capacity of the high-pressure-hydrogen storage tank 53.

More specifically, the residual capacity calculator 84 detects the amount of hydrogen stored in the high-pressure-hydrogen storage tank 53 by using the third pressure gauge 72c. The residual capacity calculator 84 calculates the residual capacity, which is the amount of hydrogen required to make the high-pressure-hydrogen storage tank 53 full from when the water level WS in the tank unit 62 has reached the upper limit height H.

The hydrogen production amount calculator 86 calculates the amount of hydrogen produced by the water electrolysis device 12 within a drainage period (drainage cycle) in which the water level WS in the gas-liquid separator 52 rises to the upper limit height H from the lower limit height L with reference to which the drainage is stopped.

More specifically, when the capacity of the tank unit 62 is a, the amount of water transmitted toward the cathode side per unit time in the steady operation is b, the amount of hydrogen produced per unit time in the steady operation is c, and the capacity of the high-pressure-hydrogen storage tank 53 is d, a drainage cycle z is calculated as z=a/b.

The amount of hydrogen production e in each drainage cycle z is calculated as e=c×z. In addition, an upper limit pressure f, which is an upper limit of the pressure at which the high-pressure-hydrogen storage tank 53 does not become full in a single drainage cycle, can be calculated on the basis of the amount of hydrogen production e and the amount of hydrogen x in the high-pressure-hydrogen storage tank 53 at a full-tank pressure g. The upper limit pressure f is calculated as f=(x−e)/d/(compressibility factor). The amount of hydrogen x can be calculated as x=d×g×(compressibility factor).

Figure 4:
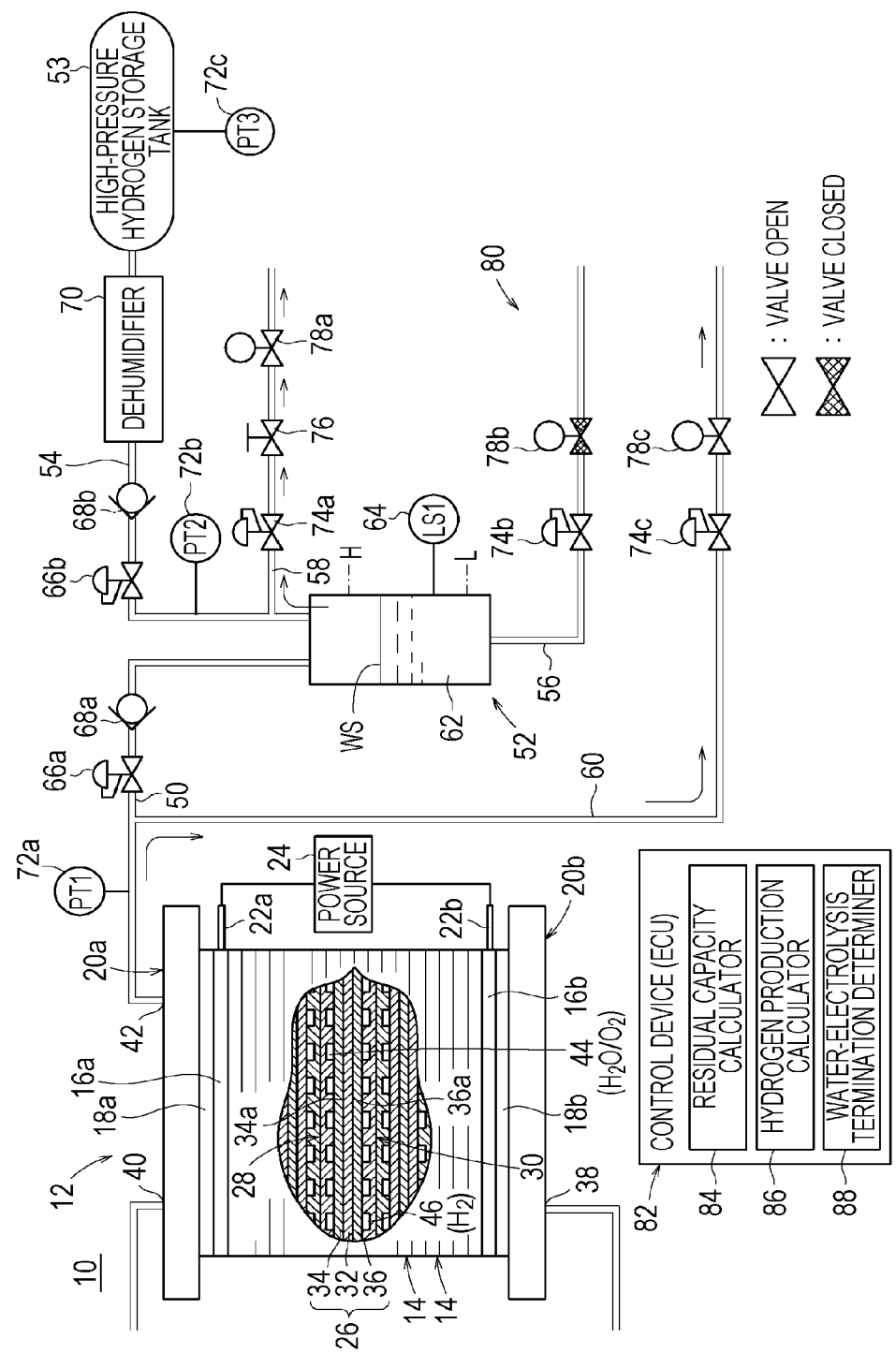
FIG. 4 illustrates the state in which a gas-phase decompression operation and an operation of decompressing a water electrolysis device are performed in the water electrolysis system.

When the amount of hydrogen produced in the next drainage cycle is greater than the residual capacity of the high-pressure-hydrogen storage tank 53, that is, when a detection pressure PT3 obtained by the third pressure gauge 72c is higher than the upper limit pressure f (YES in step S3), the process proceeds to step S4. In step S4, the first on-off valve 78a and the third on-off valve 78c are opened, and the second on-off valve 78b is closed (see FIG. 4). In addition, the electrolytic current applied to the water electrolysis device 12 is regulated so that a low current electrolysis operation is performed.

Accordingly, the gas pressure in the tank unit 62 of the gas-liquid separator 52 is reduced and the pressure at the cathode side of the water electrolysis device 12 is also reduced. During this process, the second pressure gauge 72b detects a pressure PT2 in the tank unit 62, and it is determined whether or not the detected pressure PT2 is lower than or equal to a set pressure (Low) (step S5).

Figure 5:
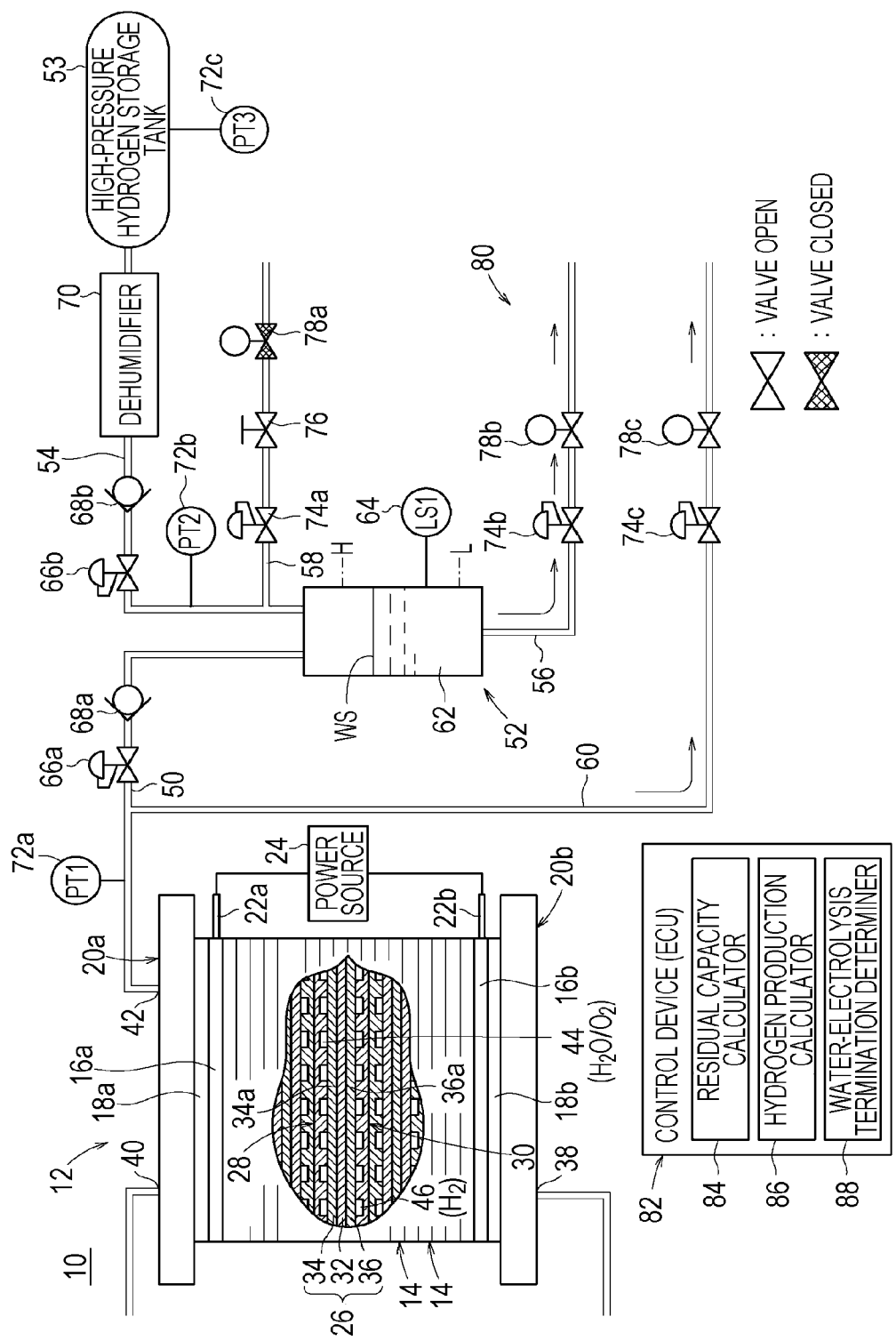
FIG. 5 illustrates the state in which a draining operation and the operation of decompressing the water electrolysis device are performed in the water electrolysis system.

When it is determined that the pressure PT2 in the tank unit 62 is lower than or equal to the set pressure (YES in step S5), the process proceeds to step S6, where the second on-off valve 78b is opened and the first on-off valve 78a is closed. Accordingly, as illustrated in FIG. 5, the water in the tank unit 62 is discharged through the drainpipe 56. In this process, the hydrogen produced by the water electrolysis device 12 is contained in the tank unit 62, and this hydrogen pushes the water that remains in the tank unit 62 into the drainpipe 56.

Then, the process proceeds to step S7, and it is determined whether or not the water level WS (LS1) in the tank unit 62 is lower than or equal to the lower limit height L, that is, whether or not the tank unit 62 is empty. If it is determined that the tank unit 62 is substantially empty (YES in step S7), the process proceeds to step S8. In step S8, the second on-off valve 78b is closed.

Next, in step S9, it is determined whether or not the pressure PT1 detected by the first pressure gauge 72a is lower than or equal to a set pressure (Low). When it is determined that the pressure PT1 is lower than or equal to the set pressure (YES in step S9), the process proceeds to step S10, where the third on-off valve 78c is closed. Accordingly, the water electrolysis process performed by the water electrolysis system 10 is stopped (system is stopped).

If it is determined that the amount of hydrogen produced in the next drainage cycle is less than or equal to the residual capacity of the high-pressure-hydrogen storage tank 53 (NO in step S3), the process proceeds to step S12. In step S12, the first on-off valve 78a is opened so that the gas pressure in the tank unit 62 of the gas-liquid separator 52 is reduced. When the pressure PT2 detected by the second pressure gauge 72b becomes lower than or equal to the set pressure (Low) (YES in step S13), the process proceeds to step S14.

Figure 6:
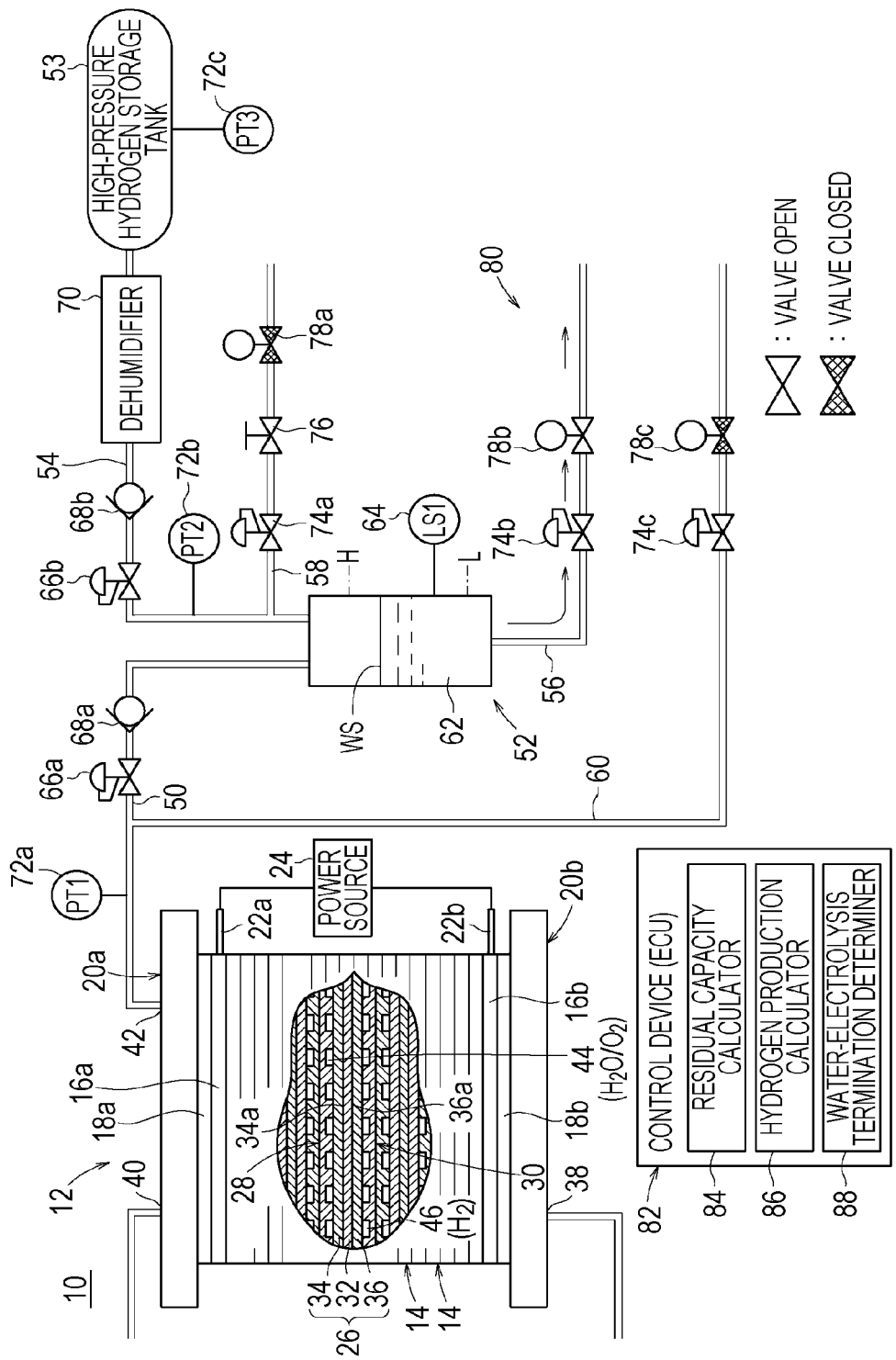
FIG. 6 illustrates the state in which the draining operation is performed in the water electrolysis system.

In step S14, the first on-off valve 78a is closed and the second on-off valve 78b is opened. Accordingly, as illustrated in FIG. 6, the water in the tank unit 62 is discharged through the drainpipe 56. Then, when the water level WS (LS1) in the tank unit 62 becomes lower than or equal to the lower limit height L (YES in step S15), the process proceeds to step S16, where the second on-off valve 78b is closed. Then, the process returns from step S16 to step S1, and the normal operation is performed. In steps S12 to S16, the low current electrolysis operation is performed.

In the first embodiment, when the amount of water in the tank unit 62 of the gas-liquid separator 52 reaches the upper limit thereof (when the water level WS reaches the upper limit height H), it is determined whether or not the amount of hydrogen produced in the drainage period of the gas-liquid separator 52 is greater than the residual capacity of the high-pressure-hydrogen storage tank 53 (step S3).

If it is determined that the amount of hydrogen produced in the drainage period of the gas-liquid separator 52 is greater than the residual capacity of the high-pressure-hydrogen storage tank 53, step S4 and the following steps are performed. Accordingly, in the water electrolysis system 10, the system is stopped after the gas-liquid separator 52 is drained.

If it is determined that the amount of hydrogen produced in the drainage period of the gas-liquid separator 52 is less than or equal to the residual capacity of the high-pressure-hydrogen storage tank 53 when the amount of water in the tank unit 62 of the gas-liquid separator 52 has reached the upper limit thereof, step S12 and the following steps are performed. Accordingly, the water electrolysis process for producing the hydrogen (normal operation) is continuously performed after the gas-liquid separator 52 is drained.

When the amount of water in the gas-liquid separator 52 is less than the upper limit thereof, the system is not stopped and the process of draining the gas-liquid separator 52 is not performed. The drainage process is performed only when the amount of water in the gas-liquid separator 52 has reached the upper limit thereof, that is, only when the amount of hydrogen that remains in the tank unit 62 is at a minimum.

As a result, the amount of hydrogen discharged from the gas-liquid separator 52 and wasted when the system is stopped can be made as small as possible, and the system efficiency can be effectively increased.

Figure 7:
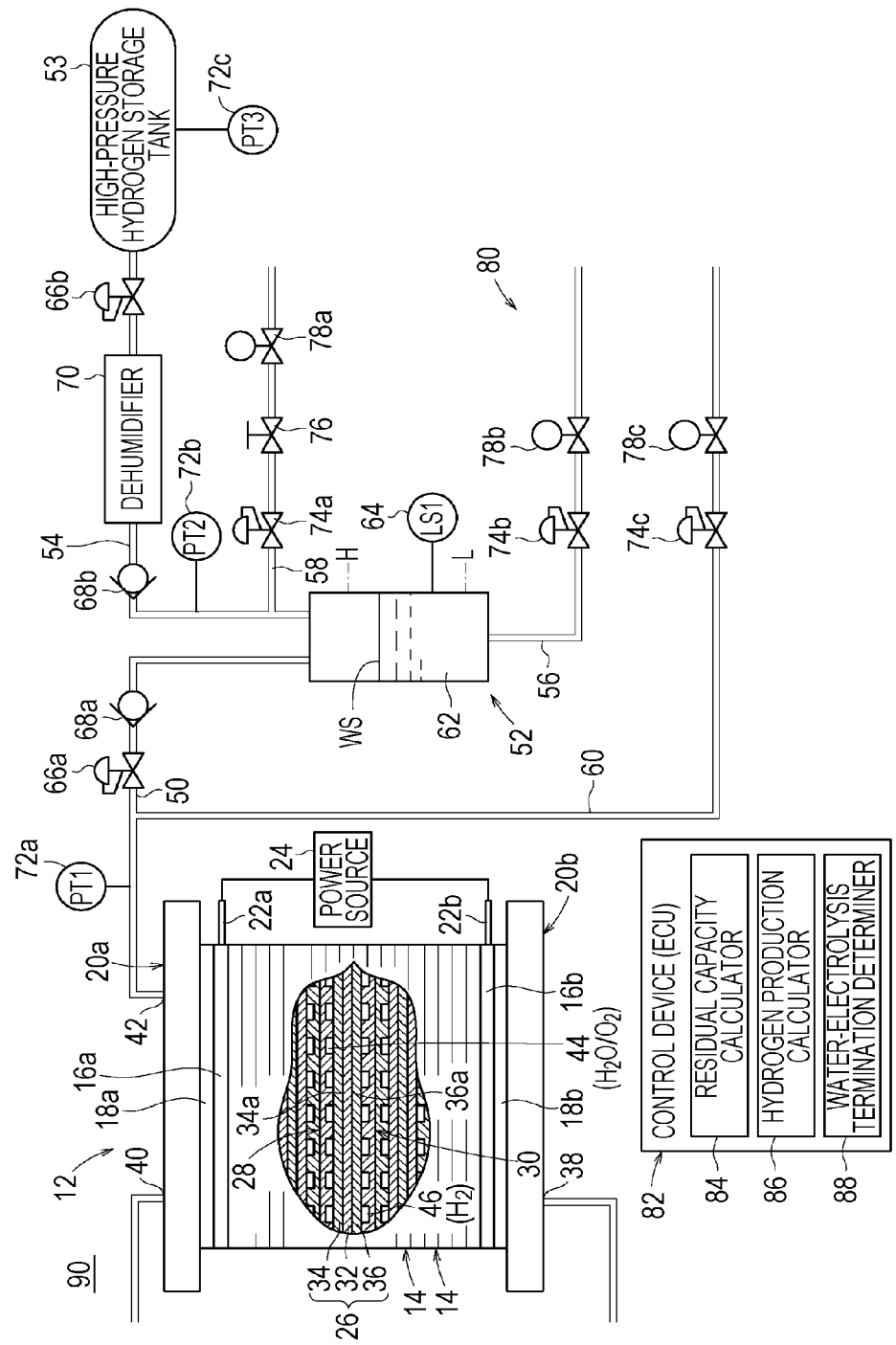
FIG. 7 is a schematic diagram illustrating a water electrolysis system according to a second embodiment.

FIG. 7 is a schematic diagram illustrating a water electrolysis system 90 according to a second embodiment.

Components similar to those in the water electrolysis system 10 according to the first embodiment are denoted by the same reference numerals, and detailed explanations thereof are thus omitted. This also applies to a third embodiment described below.

In the water electrolysis system 90, a second back-pressure valve 66b is disposed in the high-pressure-hydrogen guide pipeline 54 at a position downstream of the dehumidifier 70. Accordingly, in the second embodiment, effects similar to those of the first embodiment can be achieved.

Figure 8:
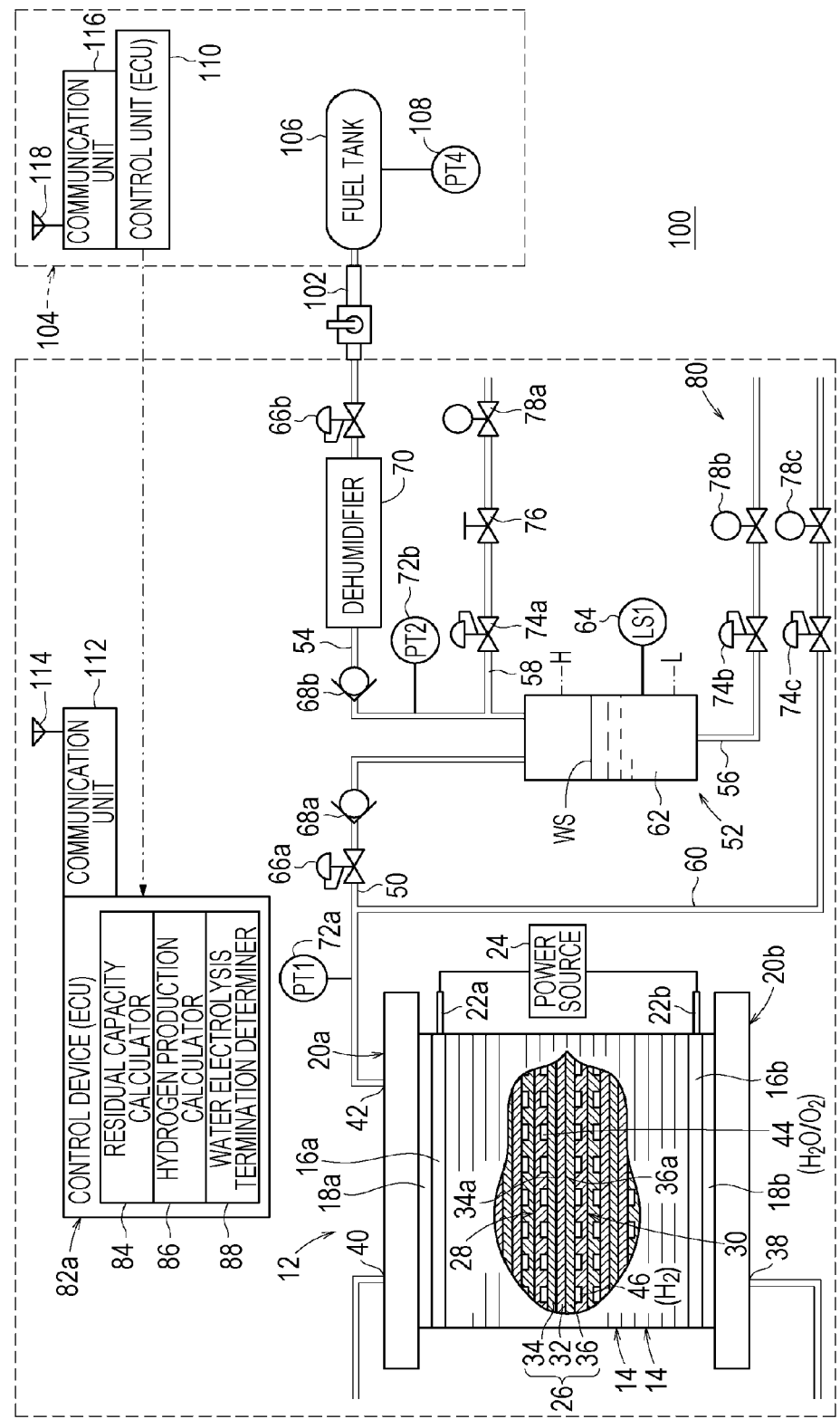
FIG. 8 is a schematic diagram illustrating a water electrolysis system according to a third embodiment.

FIG. 8 is a schematic diagram illustrating a water electrolysis system 100 according to a third embodiment.

The water electrolysis system 100 is configured to directly supply the dry hydrogen to a fuel tank (hydrogen storage device) 106 in a fuel cell vehicle (fuel cell electric automobile) 104 through a nozzle 102. The fuel tank 106 is provided with a pressure gauge 108, and the hydrogen pressure in the fuel tank 106 is detected by a vehicle control device 110, such as an on-board ECU.

Information is communicated between the water electrolysis system 100 and the fuel cell vehicle 104. The water electrolysis system 100 includes a system control device 82a that is provided with a system communication unit 112. A system antenna 114 is provided on the system communication unit 112.

The vehicle control device 110 included in the fuel cell vehicle 104 is provided with a vehicle communication unit 116. A vehicle antenna 118 is provided on the vehicle communication unit 116. Information including, for example, the pressure in the fuel tank 106, the capacity of the fuel tank 106, and the full-tank pressure of the fuel tank 106 is transmitted from the vehicle communication unit 116 to the system communication unit 112.

Figure 9:
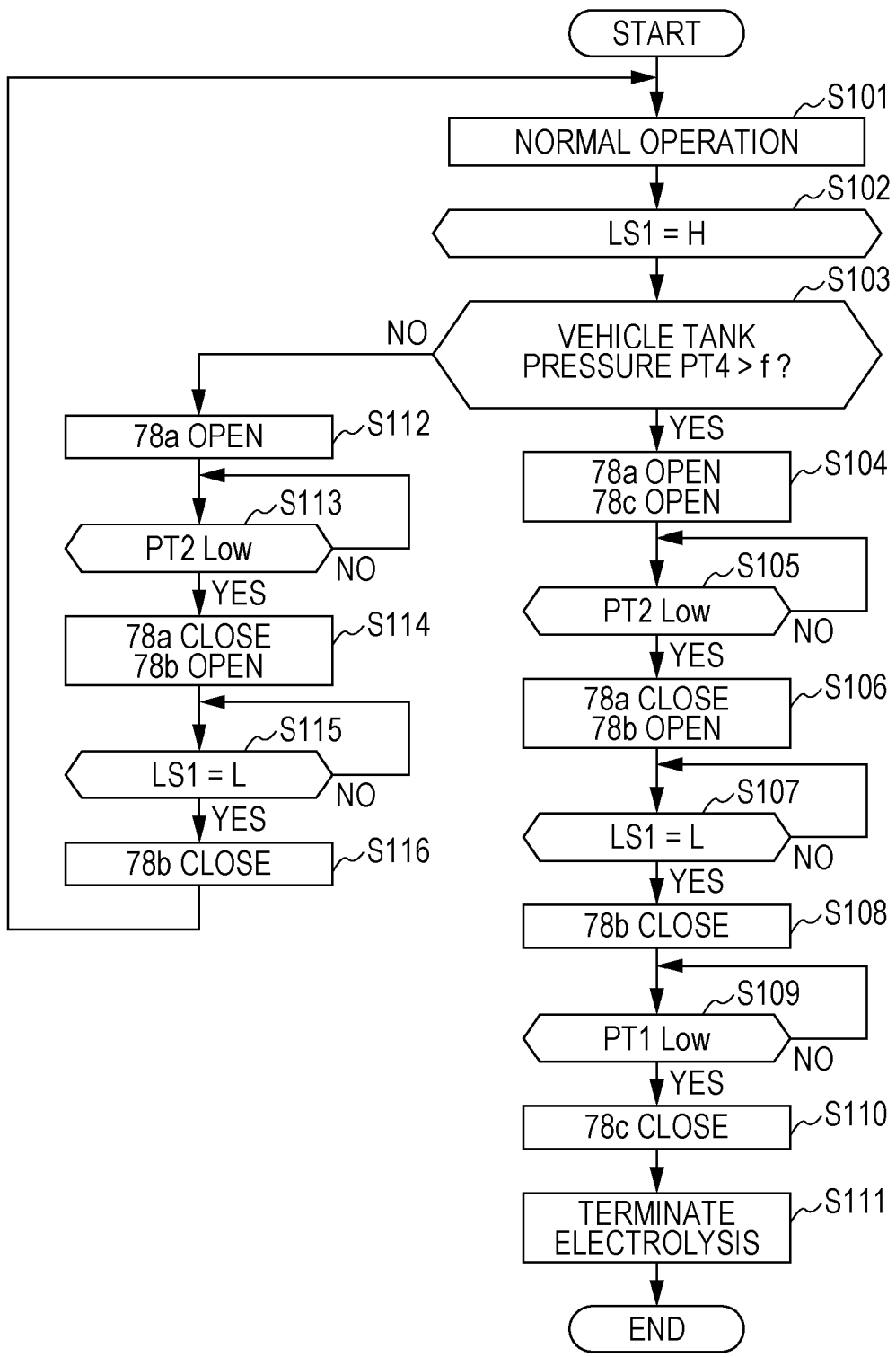
FIG. 9 is a flowchart of a method for operating the water electrolysis system.

A method for operating the water electrolysis system 100 having the above-described structure will now be described with reference to the flowchart of FIG. 9. Explanations of steps that are the same as those of the operating method according to the first embodiment illustrated in FIG. 3 will be omitted.

The system control device 82a included in the water electrolysis system 100 receives data including the capacity d of the fuel tank 106 and the full-tank pressure g of the fuel tank 106 from the vehicle control device 110 included in the fuel cell vehicle 104 through communication. In addition, the hydrogen pressure PT4 in the fuel tank 106 is continuously supplied to the system control device 82a.

When the water electrolysis system 100 is normally operated (step S101) and the water level WS in the tank unit 62 reaches the upper limit height H (step S102), the process proceeds to step S103. In step S103, the amount of hydrogen production e in a single drainage cycle is calculated, and the upper limit pressure f, which is an upper limit of the pressure at which the fuel tank 106 does not become full in a single drainage cycle, is determined.

When the amount of hydrogen produced in the next drainage cycle is greater than the residual capacity of the fuel tank 106, that is, when a detection pressure PT4 obtained by the pressure gauge 108 is higher than the upper limit pressure f (YES in step S103), the process proceeds to step S104 and the following steps. If it is determined that the amount of hydrogen produced in the next drainage cycle is less than or equal to the residual capacity of the fuel tank 106 (NO in step S103), the process proceeds to step S112 and the following steps.

Thus, in the third embodiment, when the amount of water in the gas-liquid separator 52 is less than the upper limit thereof, the process of draining the gas-liquid separator 52 is not performed. The drainage process is performed only when the amount of water in the gas-liquid separator 52 reaches the upper limit thereof, that is, only when the amount of hydrogen that remains in the tank unit 62 is at a minimum.

As a result, the amount of hydrogen discharged from the gas-liquid separator 52 and wasted when the system is stopped can be made as small as possible, and the system efficiency can be effectively increased. Thus, effects similar to those of the first embodiment can be achieved.

According to the embodiments, a water electrolysis system includes a water electrolysis device, a gas-liquid separator, a water-amount detector, a hydrogen storage device, a decompressing device, and a control device. The water electrolysis device electrolyzes water to generate oxygen and high-pressure hydrogen having a pressure higher than a pressure of the oxygen. The gas-liquid separator is provided in a hydrogen pipeline through which the high-pressure hydrogen is discharged from the water electrolysis device. The gas-liquid separator separates water from the high-pressure hydrogen. The water-amount detector detects an amount of water in the gas-liquid separator. The hydrogen storage device stores the high-pressure hydrogen from which the water is separated and which is discharged from the gas-liquid separator. The decompressing device decompresses and drains the gas-liquid separator when the water electrolysis process is terminated.

In the water electrolysis system according to the embodiments, the control device includes a residual capacity calculator, a hydrogen production calculator, and an electrolysis termination determiner. The residual capacity calculator calculates a residual capacity, which corresponds to an amount of hydrogen required to make the hydrogen storage device full from when it is detected by the water-amount detector that the amount of water in the gas-liquid separator is at an upper limit with reference to which it is determined that drainage is necessary. The hydrogen production calculator calculates an amount of hydrogen produced by the water electrolysis device in a drainage period in which the amount of water in the gas-liquid separator increases to the upper limit from a lower limit with reference to which the drainage is stopped. The electrolysis termination determiner terminates the water electrolysis process performed by the water electrolysis device when the residual capacity calculated by the residual capacity calculator is less than the amount of hydrogen calculated by the hydrogen production calculator.

A method for controlling the water electrolysis system includes calculating a residual capacity, which corresponds to an amount of hydrogen required to make the hydrogen storage device full from when it is detected by the water-amount detector that the amount of water in the gas-liquid separator is at an upper limit with reference to which it is determined that drainage is necessary, calculating an amount of hydrogen produced by the water electrolysis device in a drainage period in which the amount of water in the gas-liquid separator increases to the upper limit from a lower limit with reference to which the drainage is stopped, and terminating the water electrolysis process performed by the water electrolysis device when the calculated residual capacity is less than the calculated amount of hydrogen. The calculations of the residual capacity and the amount of hydrogen and the termination of the water electrolysis process are performed by the control device.

According to the embodiments, if the amount of hydrogen produced in the drainage period of the gas-liquid separator is greater than the residual capacity of the hydrogen storage device when the amount of water in the gas-liquid separator has reached the upper limit thereof, the gas-liquid separator is drained and the system is stopped.

If the amount of hydrogen produced in the drainage period of the gas-liquid separator is less than or equal to the residual capacity of the hydrogen storage device when the amount of water in the gas-liquid separator has reached the upper limit thereof, the gas-liquid separator is drained and the water electrolysis process for producing the hydrogen is continued.

Thus, when the amount of water in the gas-liquid separator is less than the upper limit thereof, the system is not stopped and the process of draining the gas-liquid separator is not performed. The drainage process is performed only when the amount of water in the gas-liquid separator has reached the upper limit thereof, that is, only when the amount of hydrogen that remains in the gas-liquid separator is at a minimum. As a result, the amount of hydrogen discharged from the gas-liquid separator and wasted when the system is stopped can be made as small as possible, and the system efficiency can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A water electrolysis system comprising:
a water electrolysis device to electrolyze water to generate oxygen and high-pressure hydrogen having a pressure higher than a pressure of the oxygen;
a gas-liquid separator provided in a hydrogen pipeline through which the high-pressure hydrogen is discharged from the water electrolysis device, the gas-liquid separator being provided to separate water from the high-pressure hydrogen;
a water-amount detector configured to detect an amount of water in the gas-liquid separator;
a hydrogen storage device to store the high-pressure hydrogen discharged from the gas-liquid separator;
a decompressing device to decompress and drain the gas-liquid separator when a water electrolysis process performed by the water electrolysis device is terminated; and
a control device comprising:
  a residual capacity calculator configured to calculate a residual capacity of the hydrogen storage device, the residual capacity corresponding to an amount of hydrogen required to make the hydrogen storage device full from when it is detected by the water-amount detector that the amount of water in the gas-liquid separator is at an upper limit with reference to which it is determined that drainage of the water in the gas-liquid separator is necessary;
  a hydrogen production amount calculator configured to calculate an amount of hydrogen produced by the water electrolysis device in a drainage period in which the amount of water in the gas-liquid separator increases to the upper limit from a lower limit with reference to which the drainage is stopped; and
  an electrolysis termination determiner configured to terminate the water electrolysis process when the amount of hydrogen calculated by the hydrogen production amount calculator is greater than the residual capacity calculated by the residual capacity calculator.

2. A method for operating a water electrolysis system, the method comprising:
calculating a residual capacity of a hydrogen storage device using a control device, the residual capacity corresponding to an amount of hydrogen required to make the hydrogen storage device full from when an amount of water in a gas-liquid separator is at an upper limit with reference to which it is determined that drainage is necessary, the hydrogen storage device being to store a high-pressure hydrogen discharged from the gas-liquid separator;
calculating, using the control device, an amount of hydrogen produced by a water electrolysis device in a drainage period in which the amount of water in the gas-liquid separator increases to the upper limit from a lower limit with reference to which the drainage is stopped; and
terminating a water electrolysis process performed by the water electrolysis device when the amount of hydrogen calculated by the control device is greater than the residual capacity calculated by the control device.

* * * * *